United States Patent
Wu et al.

(10) Patent No.: US 11,946,636 B2
(45) Date of Patent: Apr. 2, 2024

(54) ANTI-GLARE REFRACTORS FOR LUMINAIRES

(71) Applicant: ABL IP Holding LLC, Atlanta, GA (US)

(72) Inventors: Yinan Wu, Atlanta, GA (US); Melissa Ricketts, Conyers, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 17/545,511

(22) Filed: Dec. 8, 2021

(65) Prior Publication Data

US 2023/0175670 A1 Jun. 8, 2023

(51) Int. Cl.
*F21V 5/02* (2006.01)
*G02B 1/11* (2015.01)

(52) U.S. Cl.
CPC . *F21V 5/02* (2013.01); *G02B 1/11* (2013.01)

(58) Field of Classification Search
CPC ........ F21V 5/008; F21V 5/02; F21Y 2103/10; F21Y 2115/10; G02B 1/11
See application file for complete search history.

(56) References Cited

U.S. PATENT DOCUMENTS

| | | | |
|---|---|---|---|
| 7,559,672 B1* | 7/2009 | Parkyn | A47F 3/04 362/127 |
| 9,683,717 B1* | 6/2017 | Householder | F21V 5/008 |
| 10,323,823 B2* | 6/2019 | Gloss | F21S 41/275 |
| 2013/0033863 A1* | 2/2013 | Gould | F21V 5/008 362/235 |
| 2013/0271978 A1* | 10/2013 | Gould | F21S 8/06 362/311.06 |

FOREIGN PATENT DOCUMENTS

JP 2008277025 A * 11/2008

* cited by examiner

*Primary Examiner* — Elmito Breval
(74) *Attorney, Agent, or Firm* — Kilpatrick Townsend & Stockton LLP

(57) ABSTRACT

An anti-glare refractor for a luminaire may include an optic body having a light entrance side and a light exit side. The optic body may include a material characterized by an index of refraction. The light entrance side may include a substantially flat surface, and the light exit side may include a plurality of prisms each defined by a plurality of facet surfaces. Each facet surface may have a prism slope angle with respect to the substantially flat surface. The prism slope angle may be in a range from about 5 degrees to about 45 degrees.

28 Claims, 6 Drawing Sheets prism slope angle:

$\phi = 60$ degrees prism slope angle:

$\phi = 45$ degrees prism slope angle:

$\phi = 30$ degrees

ANTI-GLARE REFRACTORS FOR LUMINAIRES

BACKGROUND

A luminaire can include one or more light emitters accompanied by optical enhancements (e.g., reflectors, lenses, diffusers, etc.) to control the directionality and appearance of the light as it exits the luminaire. These light emitters and optics are typically housed in a luminaire housing that can take on a variety of different shapes, sizes, and other geometries. Luminaires sometimes provide a bright area on the fixture from which light emanates, that can be in stark contrast to the lighting environment surrounding the luminaire. This contrast increases the glare perception of an observer and can make the light visibly uncomfortable to the observer. Improvements to reduce glare in luminaires are desired, while still providing sufficient luminous area to minimize the number of luminaires needed to light a given area.

SUMMARY

According to some embodiments, an anti-glare refractor for a luminaire may include an optic body having a light entrance side and a light exit side. The optic body includes a material characterized by an index of refraction. The light entrance side may include a substantially flat surface, and the light exit side may include a plurality of prisms each defined by a plurality of facet surfaces. Each facet surface may have a prism slope angle with respect to the substantially flat surface. The prism slope angle may be in a range from about 5 degrees to about 45 degrees.

According to some embodiments, a luminaire may include a light engine that includes a plurality of light sources arranged as a two-dimensional array. The luminaire may further include an optic body having a light entrance side facing the light engine and a light exit side facing away from the light engine. The optic body includes a material characterized by an index of refraction. The light entrance side may include a substantially flat surface, and the light exit side may include a plurality of prisms each defined by a plurality of facet surfaces. Each facet surface may have a prism slope angle with respect to the substantially flat surface. The prism slope angle may be in a range from about 5 degrees to about 45 degrees.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

To produce luminaires that are visually attractive and optically efficient, optical refractors, such as Fresnel or prismatic refractors, can be used to control glare. The unified glare rating (UGR) is an objective measure of glare that is used by lighting designers to help control the risk that occupants of a building will experience glare from the artificial lighting. While the UGR requirement does not specify a particular light distribution shape, it generally favors elimination of high-angle light above 60 degrees from vertical.

Traditional Fresnel lenses or prismatic refractors usually require a single fixed-position optical center. Only when the light comes from or near that optical center, those refractors can generate the target distribution. If there are multiple light sources that have small distances (e.g., <0.2 inches) to the refractors, the refractors often cannot control the distribution and high angle light well. Embodiments of the present invention provide refractors that can effectively limit high-angle light for luminaires with multiple light sources.

Figure 1:
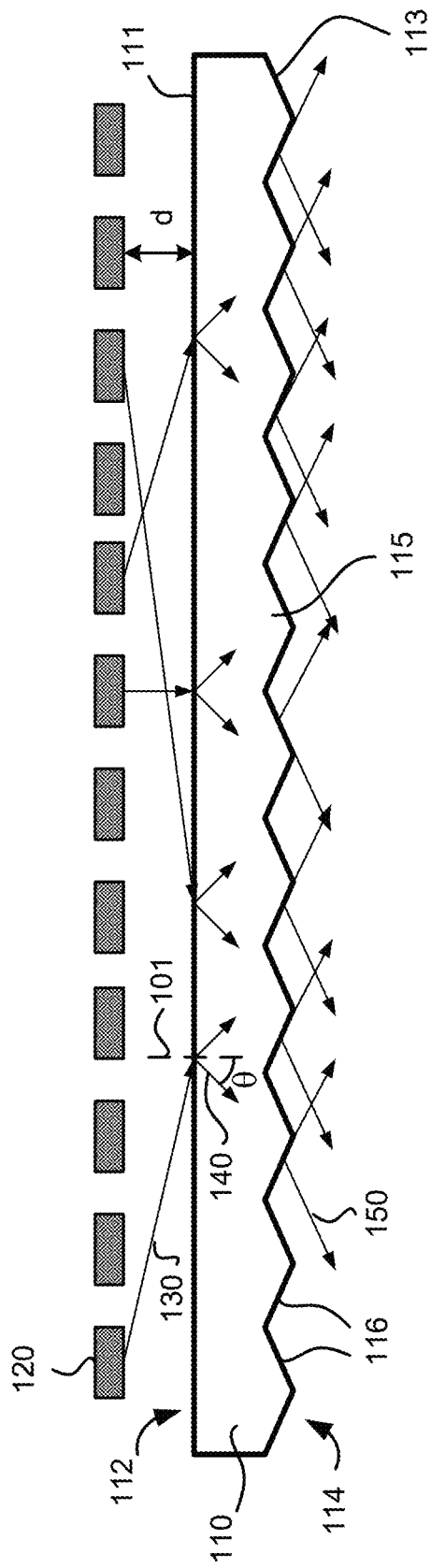
FIG. 1 shows a schematic cross-sectional view of an anti-glare refractor for a luminaire according to some embodiments.

FIG. 1 shows a schematic cross-sectional view of an anti-glare refractor for a luminaire according to some embodiments. The anti-glare refractor includes an optic body 110 that is positioned below an array of light sources 120. The array of light sources 120 can be a two-dimensional array, extending also in the direction out of the page. The light sources can be, for example, light-emitting diodes (LEDs), fluorescent light sources, and the like.

The optic body 110 includes a light entrance side 112 that faces the light sources 120, and a light exit side 114 that faces away from the light sources 120. The optic body 110 can be made of a transparent material, such as glass, silicone, acrylic, polycarbonate, and the like. According to some embodiments, the light entrance side 112 of the optic body 110 can include a substantially flat surface (referred to herein as the inner surface 111), and the light exit side 114 of the optic body 110 can include a plurality of prisms 115 having facet surfaces 116 provided on the outer surface 113.

As illustrated in FIG. 1, light rays 130 emitted from the light sources 120 can be incident on the inner surface 111 of the optic body 110, and be refracted into the optic body 110. Assuming that the refractive index of the optic body 110 is in a range from 1.4 to 1.6, for a light ray incident at a 90-degree angle of incidence (e.g., at grazing incidence, which is the largest possible angle of incidence), the angle of refraction (i.e., the angle θ between the refracted light rays 140 and the normal 101 of the inner surface 111) would be about 45 degrees. Therefore, the angles of refraction for the refracted light rays 140 can be equal to or less than about 45 degrees.

Still referring to FIG. 1, the refracted light rays 140 may be incident on the outer surface 113 of the optic body 110, and be refracted out of the optic body 110 through the prisms 115. With proper selection of the prism slope angles at the outer surface 113, it is possible to limit the exit angles of the refracted light rays 150 with respect to vertical to about 60 degrees or less. (The term "vertical" refers herein to the direction normal to the inner surface 111 and pointing downward away from the light sources 120.) This advantage may be achieved by having the flat surface as the inner surface 111 and the prismatic surface as the outer surface 113. According to various embodiments, the refractive index of the optic body 110 can be in a range from about 1.3 to about 1.7, or from about 1.4 to about 1.6.

Prism Slope Angle Selection

Figure 2:
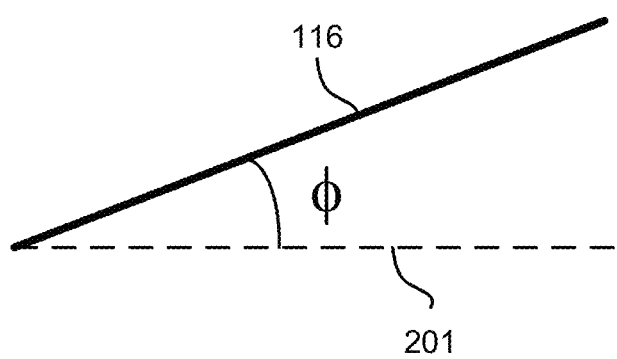
FIG. 2 illustrates a prism slope angle between a facet of a prismatic surface and a horizontal surface in an anti-glare refractor according to some embodiments.

The prism slope angle $\phi$ is defined as the angle between a facet surface 116 of a prism 115 on the outer surface 113 and a horizontal surface 201 (i.e., parallel to the inner surface 111 on the light entrance side 112 of the optic body 110), as illustrated in FIG. 2. The selection of the prism slope angle $\phi$ can affect the amount of high-angle light, as discussed below.

Figure 3A:
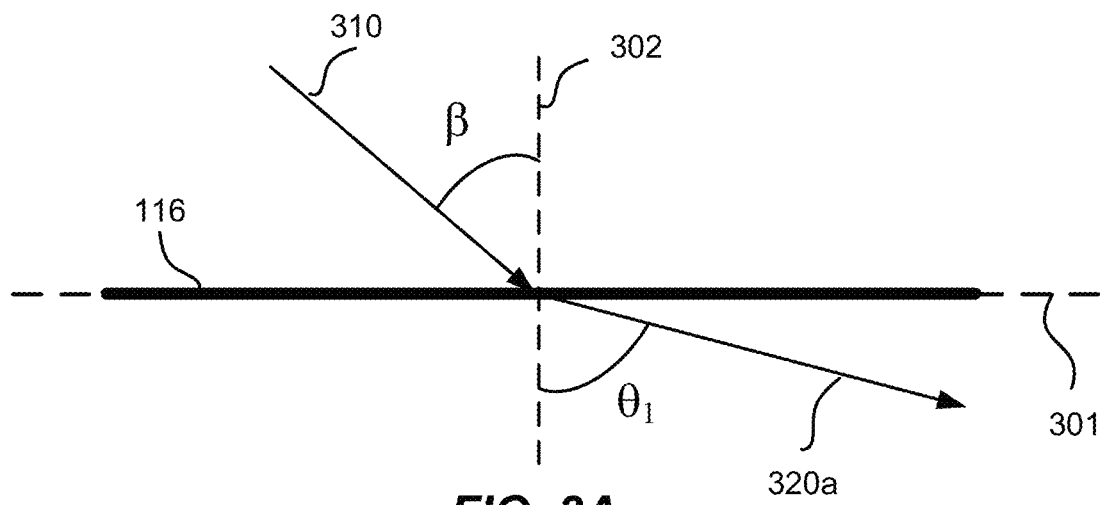
FIGS. 3A-3C illustrate how the prism slope angle may affect the exit angle of refracted light exiting an anti-glare refractor according to some embodiments.
Figure 3B:
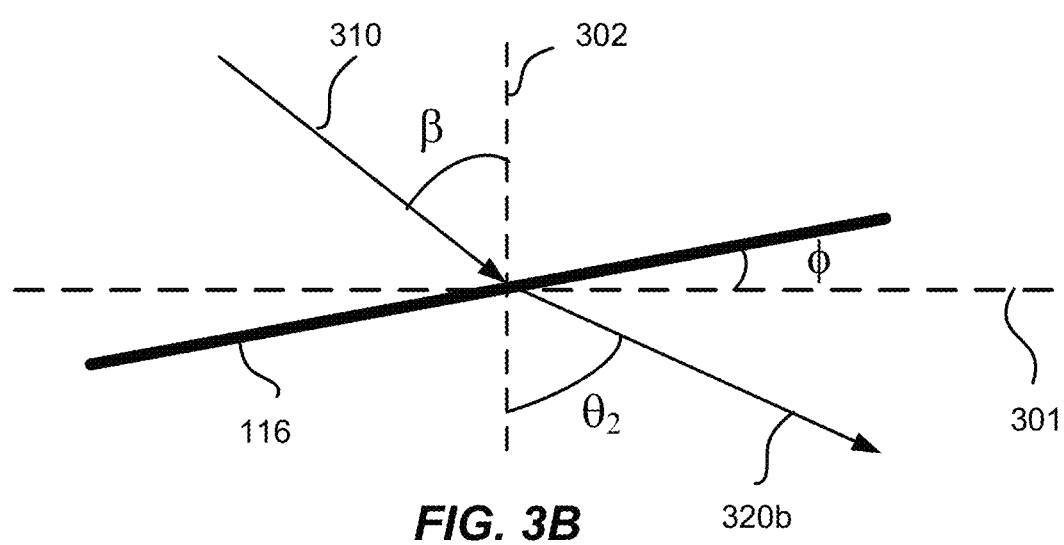
Figure 3C:
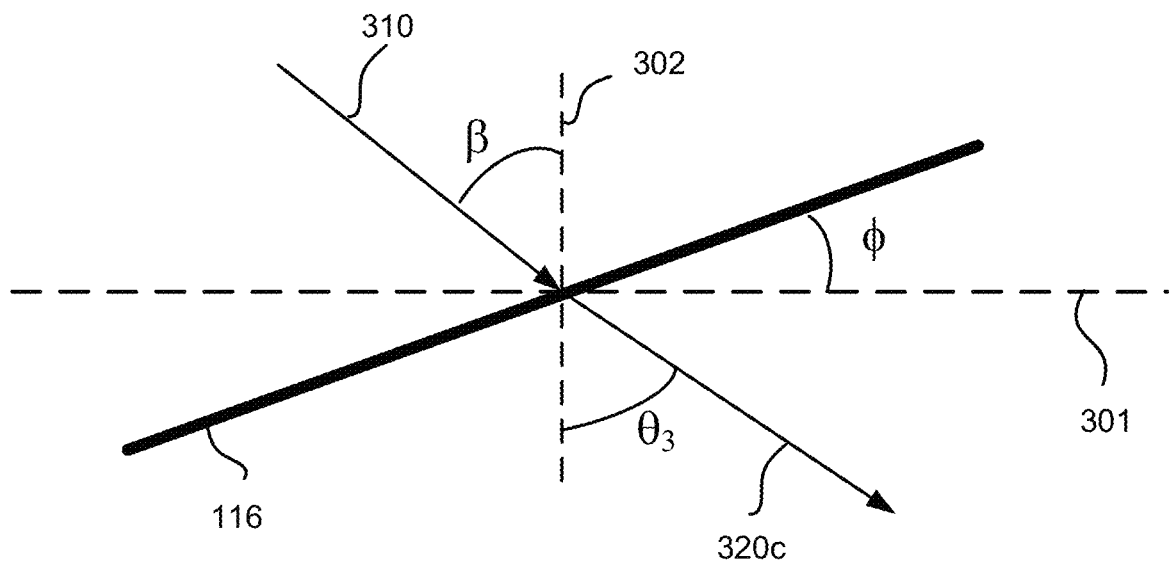

FIGS. 3A-3C illustrate how the prism slope angle $\phi$ may affect the exit angle of light refracted out of the optic body 110. In FIG. 3A, the facet surface 116 extends along the horizontal 301 (perpendicular to the vertical 302). Thus, the prism slope angle $\phi$ is at zero (0) degrees relative to horizontal 301. In FIG. 3B, the prism slope angle $\phi$ is increased to about 10 degrees relative to horizontal 301. In FIG. 3C, the prism slope angle $\phi$ is increased to about 20 degrees relative to horizontal 301. As illustrated, for an incident light ray 310 at the same incidence angle $\beta$ with respect to vertical 302, the exit angle $\theta$ of the refracted light ray 320a, 320b, or 320c with respect to the vertical 302 decreases with increasing prism slope angle $\phi$ (e.g., $\theta_1 > \theta_2 > \theta_3$). Thus, if the prism slope angle $\phi$ is too low, the amount of high-angle light exiting the optic body 110 can be greater than desired, which can result in more glare.

The term "exit angle" refers herein to the angle between a light ray 320a, 320b, or 320c refracted out of the optic body 110 and the vertical 302. The term "vertical" refers herein to the direction normal to the inner surface 111 and pointing downward away from the light sources 120, as defined above. The "exit angle" is not to be confused with the term "angle of refraction," which refers to the angle between a light ray 320a, 320b, or 320c refracted out of the optic body 110 and the normal of the facet surface 116. The term "incidence angle" refers herein to the angle between an incident light ray 310 and the vertical 302. The "incidence angle" is not to be confused with the term "angle of incidence," which refers to the angle between an incident light ray 310 and the normal of the facet surface 116.

Figure 4A:
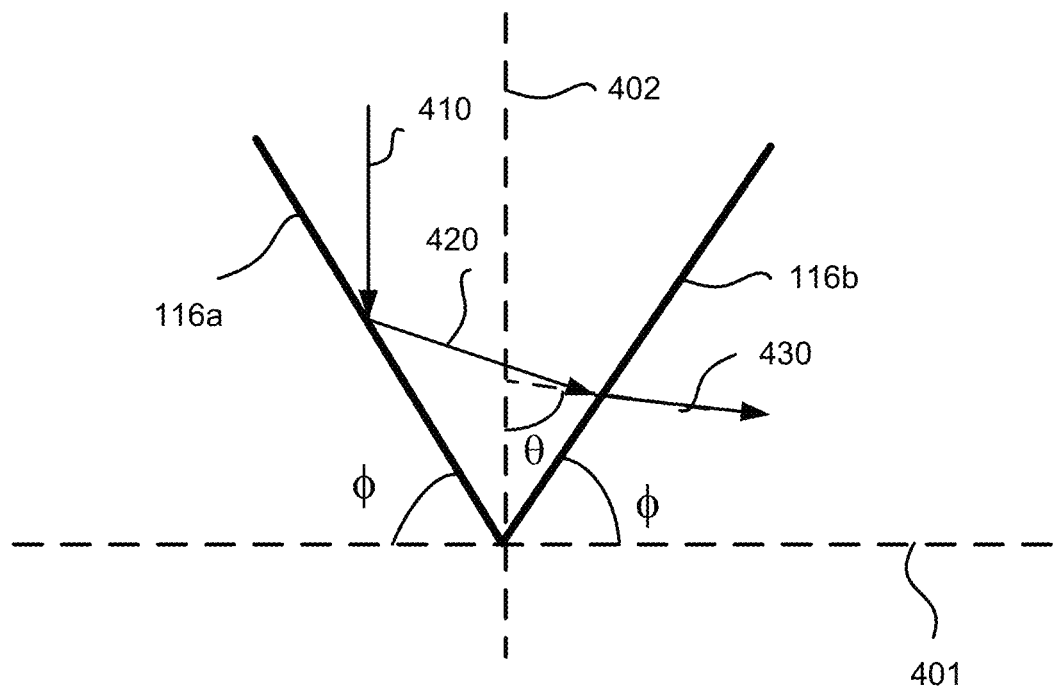
FIGS. 4A and 4B illustrate some exemplary light paths for configurations in which the prism slope angle of the prism facets are about 60 degrees and 45 degrees, respectively, according to some embodiments.
Figure 4B:
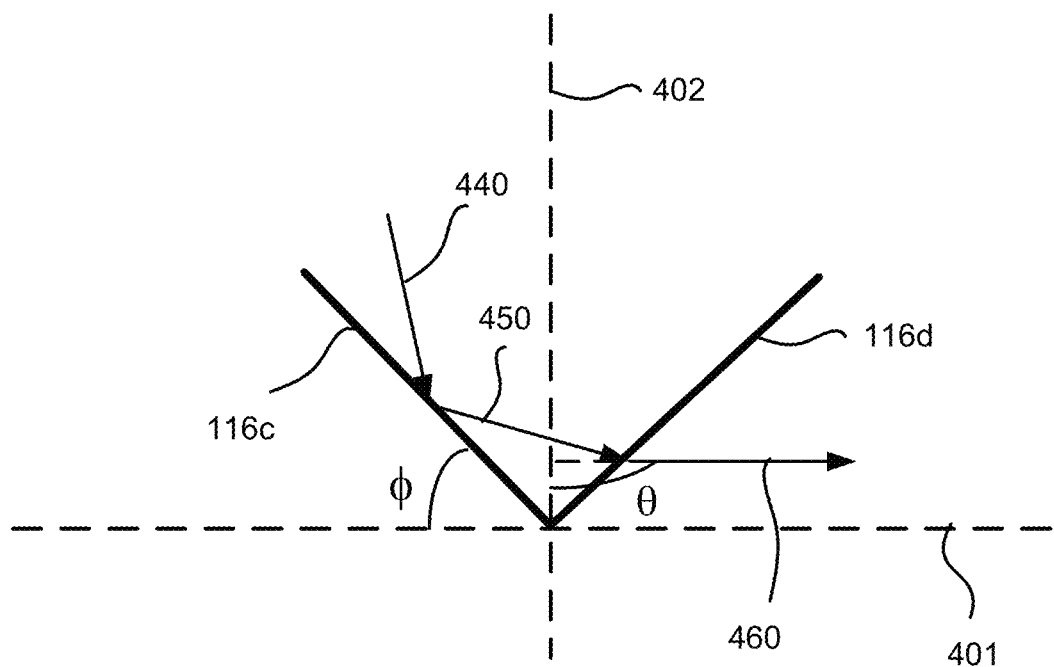

On the other hand, it can also be disadvantageous if the prism slope angle $\phi$ is too high. FIG. 4A illustrates a configuration in which the prism slope angle $\phi$ of the facet surfaces 116a and 116b is about 60 degrees relative to horizontal 401. As illustrated, a light ray 410 incident at the first facet surface 116a at near vertical incidence (i.e., substantially parallel to vertical 402) can undergo total internal reflection at the first facet surface 116a. The reflected light ray 420 can then be refracted by the second facet surface 116b. The refracted light ray 430 exits the optic body 110 at a rather large exit angle $\theta$ with respect to the vertical 402 (e.g., greater than about 60 degrees), which can result in more glare. FIG. 4B illustrates a configuration in which the prism slope angle $\phi$ of the facet surfaces 116c and 116d is about 45 degrees relative to horizontal 401. Similarly, a light ray 440 incident at the first facet surface 116c can undergo total internal reflection at the first facet surface 116c. The reflected light ray 450 can be refracted by the second facet surface 116d, which results in a refracted light ray 460 exiting the optic body 110 at a rather large angle with respect to the vertical (e.g., greater than about 60 degrees).

According to various embodiments, the optimal prism slope angle $\phi$ can be in a range from about 5 degrees to about 45 degrees, or from about 10 degrees to about 40 degrees, or from about 15 degrees to about 35 degrees, or from about 20 degrees to about 40 degrees, or from about 25 degrees to about 35 degrees.

Figure 5A:
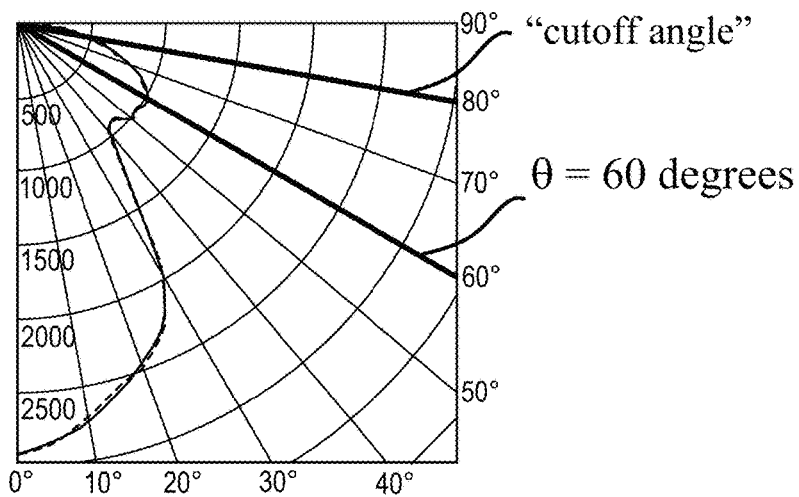
FIGS. 5A, 5B, and 5C show polar plots of light distributions from simulation results, for prism slope angles of 60 degrees, 45 degrees, and 30 degrees, respectively, according to some embodiments.
Figure 5B:
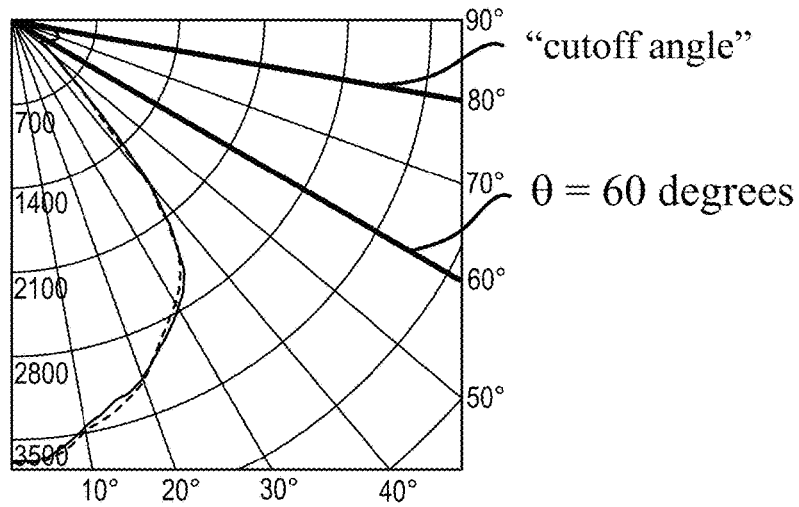
Figure 5C:
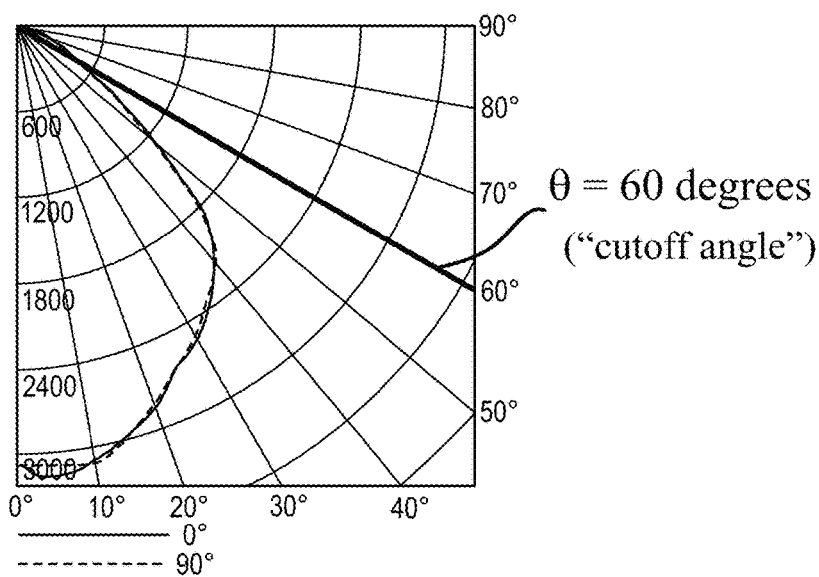

FIGS. 5A, 5B, and 5C show polar plots of light distributions from simulation results, for prism slope angles $\phi$ of 60 degrees, 45 degrees, and 30 degrees, respectively. The solid lines show the lumen values for azimuthal angle of zero degrees; the dashed lines show the lumen values for azimuthal angle of 90 degrees. As illustrated in FIG. 5A, for a prism slope angle $\phi=60$ degrees, the "cutoff angle" is about 80 degrees. The cutoff angle is the exit angle $\theta$ (with respect to vertical) above which there is very little light. Thus, at the prism slope angle $\phi=60$ degrees, the cutoff angle is much higher than the desired 60 degrees. As illustrated in FIG. 5B, for a prism slope angle $\phi=45$ degrees, the cutoff angle is also about 80 degrees, although the lumen values at exit angles $\theta$ greater than 60 degrees are smaller than those for the prism slope angle $\phi=60$ degrees as shown in FIG. 5A. In contrast, as illustrated in FIG. 5C, for a prism slope angle $\phi=30$ degrees, the cutoff angle is about 60 degrees, which is the desired cutoff angle. Thus, a prism slope angle of 30 degrees can provide satisfactory control of high-angle light.

Referring again to FIG. 1, the distance d between the light sources 120 and the inner surface 111 of the optic body 110 can be varied. An advantage of this optical design is that the distance d can be varied in a range (e.g., from about 0.1 inches to about 3 inches) without meaningfully affecting the light distribution. Also, the optic body 110 can be shifted laterally left and right (or in and out of the page) without meaningful affecting the light distribution. These characteristics can afford less stringent optical alignment requirements for the luminaire.

Prism Shapes and Patterns

Figure 6A:
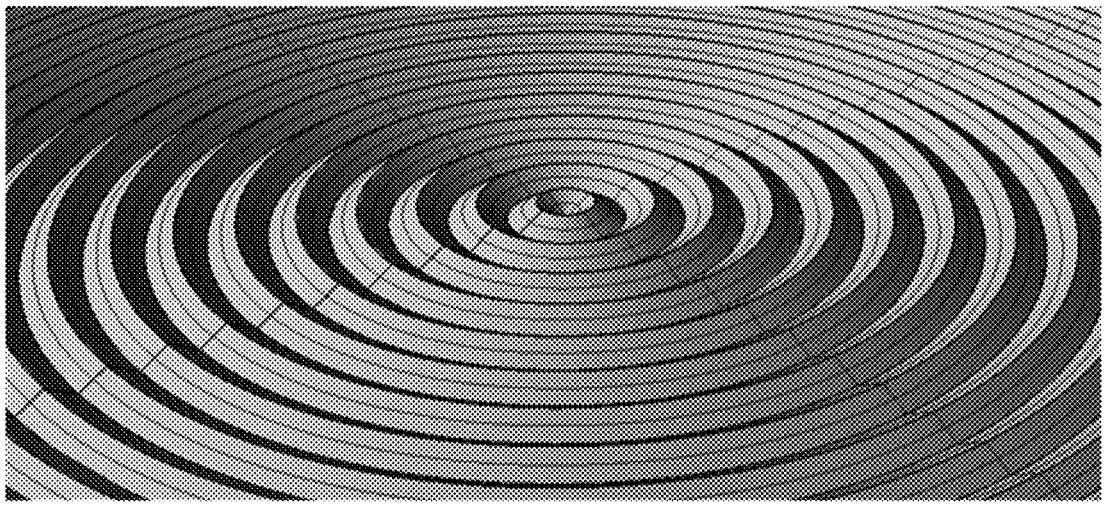
FIGS. 6A-6C illustrate some exemplary prism patterns according to some embodiments.
Figure 6B:
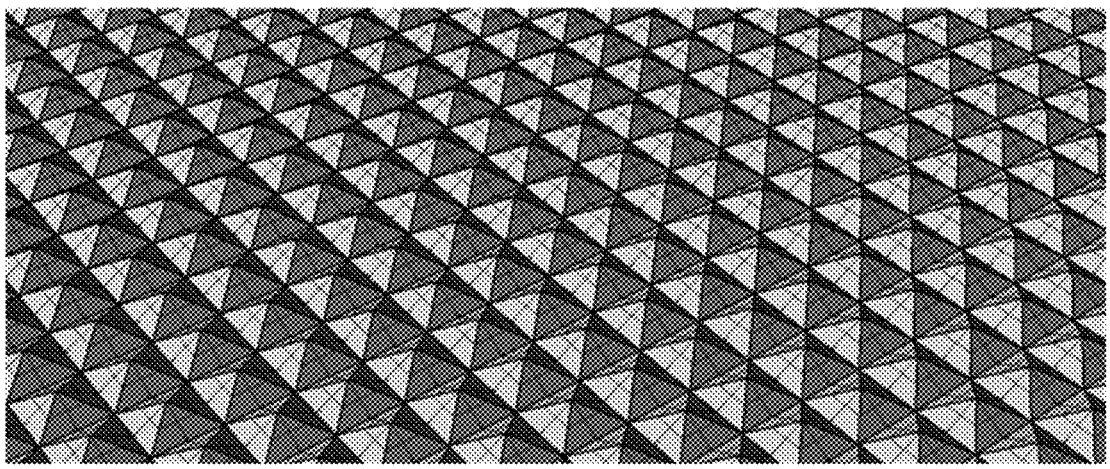
Figure 6C:
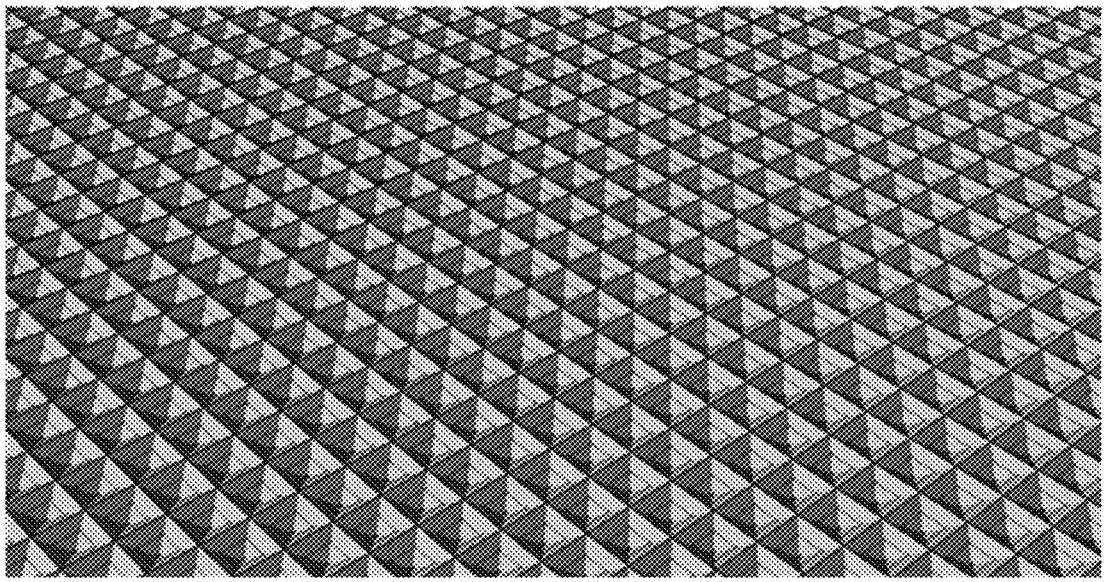

Various prism shapes, sizes, and patterns can be used according to various embodiments. FIGS. 6A-6C illustrate some exemplary prism patterns. FIG. 6A shows a revolved prism pattern according to some embodiments. Here, the outer surface 113 of the optic body 110 includes a series of concentric annular ridges. Each annular ridge can have a triangular prism cross-section formed by two facet surfaces (i.e., the annular ridges are formed by "revolving" the triangular cross-section around the center of the annular ridges).

FIG. 6B shows a pyramid prism pattern according to some embodiments. Here, the outer surface 113 of the optic body 110 includes a two-dimensional array of square-based pyramids, each pyramid including four facet surfaces. FIG. 6C shows an inverted pyramid pattern provided on the outer surface 113 of the optic body 110. Here, instead of having an array of pyramids protruding outwardly from the outer surface 113 with their apexes extending away from the inner surface 111, the outer surface 113 of the optic body 110 includes a two-dimensional array of pyramid-shaped "dents," each dent defined by four facet surfaces.

According to various embodiments, the pyramids (or pyramid dents) can also be triangular-based, hexagonal-based, or rectangular-based. In some embodiments, the facets of each individual prism can have different prism slope angles (e.g., for rectangular-based pyramids, the prism slope angles of the two orthogonal sets of facets would be different from each other). In some embodiments, the prism slope angles of different prisms can be different from each other. Furthermore, in addition to the examples illustrated in FIGS. 6A-6C, the outer surface 113 of the optic body 110 can have other prism shapes and patterns. As discussed above, regardless of the specific prism shapes and patterns, as long as the inner surface 111 is substantially flat and the prism slope angle ϕ of the facet surfaces 116 of the prisms 115 on the outer surface 113 is properly selected, high-angle light in the light distribution can be effectively controlled, thereby achieving desired control of glare in the luminaires.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

While illustrative and presently preferred embodiments of the disclosed systems have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise," "comprising," "contains," "containing," "include," "including,", and "includes," when used in this specification and in the following claims, are intended to specify the presence of stated features, integers, components, or steps, but they do not preclude the presence or addition of one or more other features, integers, components, steps, acts, or groups.

What is claimed is:

1. An anti-glare refractor for a luminaire having a plurality of light sources, the anti-glare refractor comprising:
    an optic body comprising:
        a light entrance side comprising a substantially flat inner surface, the substantially flat inner surface being linear over an entire surface that is adapted to receive light rays generated by the plurality of light sources; and
        a light exit side comprising an outer surface opposite the substantially flat inner surface and from which the light rays exit the anti-glare refractor, wherein a plurality of prisms are distributed on the outer surface and wherein each prism of the plurality of prisms is defined by a plurality of planar facet surfaces, each planar facet surface having a prism slope angle in a range from about 5 degrees to about 45 degrees with respect to the substantially flat inner surface, wherein each prism comprises an axis passing through an intersection of the planar facet surfaces defining the prism and wherein the prism is approximately symmetrical about the axis,
    wherein the plurality of prisms are configured such that, regardless of a position of each of the plurality of light sources relative to the anti-glare refractor, when at least some of the light rays generated by the plurality of light sources are received by the substantially flat inner surface, said light rays exit the anti-glare refractor at an exit angle of 60 degrees or less when measured from an axis extending from and normal to the substantially flat inner surface in a direction toward the outer surface, such that the anti-glare refractor produces an anti-glare light distribution.

2. The anti-glare refractor of claim 1, wherein the optic body comprises a material characterized by an index of refraction in a range from about 1.3 to about 1.7.

3. The anti-glare refractor of claim 2, wherein the index of refraction is in a range from about 1.4 to about 1.6.

4. The anti-glare refractor of claim 1, wherein the prism slope angle is in a range from about 10 degrees to about 40 degrees.

5. The anti-glare refractor of claim 1, wherein the plurality of prisms form a plurality of annular ridges having a triangular cross-section on the light exit side of the optic body.

6. The anti-glare refractor of claim 1, wherein the plurality of prisms form a two-dimensional array of pyramids on the light exit side of the optic body, where each pyramid comprises an apex and a base more proximate the light entrance side than the apex.

7. The anti-glare refractor of claim 6, wherein each of the pyramids comprise a triangular-base, a square-base, a rectangular-base, or a hexagonal-base.

8. The anti-glare refractor of claim 1, wherein the plurality of prisms form a two-dimensional array of inverted pyramid dents on the light exit side of the optic body, where each pyramid dent comprises an apex and a base more distal the light entrance side than the apex.

9. The anti-glare refractor of claim 8, wherein the bases of the inverted pyramid dents are triangular, square, rectangular, or hexagonal.

10. The anti-glare refractor of claim 1, wherein the anti-glare light distribution is substantially unaffected upon laterally altering the relative positioning between the plurality of light sources and the refractor.

11. The anti-glare refractor of claim 1, wherein the anti-glare light distribution is substantially unaffected upon vertically altering the relative positioning between the plurality of light sources and the refractor.

12. The anti-glare refractor of claim 1, wherein each of the plurality of prisms has a base, an apex, and a height measured from the base to the apex.

13. The anti-glare refractor of claim 12, wherein the height of each of the plurality of prisms is substantially the same.

14. The anti-glare refractor of claim 12, wherein the planar facet surfaces of each of the plurality of prisms are inclined at the same angle with respect to the base.

15. The anti-glare refractor of claim 12, wherein the bases of adjacent prisms are coplanar.

16. The anti-glare refractor of claim 12, wherein the apexes of adjacent prims are separated a distance and wherein the distance is substantially constant along a direction of the refractor.

17. The anti-glare refractor of claim 1, wherein the plurality of prisms are arranged on the outer surface in concentric annular ridges.

18. The anti-glare refractor of claim 1, wherein the plurality of facet surfaces of each prism comprises at least three planar facet surfaces that define a pyramid.

19. The anti-glare refractor of claim 1, wherein the at least some light rays comprises a majority of the light rays generated by the plurality of light sources.

20. A luminaire comprising:
a light engine comprising a plurality of light sources arranged as a two-dimensional array;
an optic body comprising:
a light entrance side comprising a substantially flat inner surface, the substantially flat inner surface being linear over an entire surface that is adapted to receive light rays generated by the plurality of light sources; and
a light exit side comprising an outer surface opposite the linear inner surface and from which the light rays exit, wherein a plurality of prisms are distributed on the outer surface and wherein each prism of the plurality of prisms is defined by a plurality of facet surfaces, each facet surface having a prism slope angle in a range from about 5 degrees to about 45 degrees with respect to the substantially flat inner surface, wherein each prism comprises an axis passing through an intersection of the facet surfaces defining the prism and wherein the prism is approximately symmetrical about the axis,
wherein the plurality of prisms are configured such that, regardless of a position of each of the plurality of light sources relative to the optic body, when at least some of the light rays generated by the plurality of light sources are received by the substantially flat inner surface, said light rays exit the optic body at an exit angle of 60 degrees or less when measured from an axis extending from and normal to the substantially flat inner surface in a direction toward the outer surface, such that the optic body produces an anti-glare light distribution, and
wherein the plurality of prisms are arranged on the outer surface in concentric annular ridges, wherein a first prism of the plurality of prisms comprises a continuous facet extending along a first circular path and wherein a second prism of the plurality of prisms comprises a continuous facet extending along a second circular path concentric with and offset from the first circular path.

21. The luminaire of claim 20, wherein the plurality of light sources comprises a plurality of light-emitting diodes (LEDs), a plurality of fluorescent light sources, or a combination thereof.

22. The luminaire of claim 20, wherein the prism slope angle is in a range from about 10 degrees to about 40 degrees.

23. The luminaire of claim 20, wherein the optic body comprises a material characterized by an index of refraction in a range from about 1.3 to about 1.7.

24. The luminaire of claim 23, wherein the index of refraction is in a range from about 1.4 to about 1.6.

25. The luminaire of claim 20, wherein a distance between the plurality of light sources and the light entrance side of the optic body is in a range from about 0.1 inches to about 3 inches.

26. The luminaire of claim 20, wherein each of the plurality of prisms comprises a triangular cross-section on the light exit side of the optic body.

27. An anti-glare refractor for a luminaire having a plurality of light sources, the anti-glare refractor comprising:
an optic body comprising:
a light entrance side comprising a substantially flat inner surface, the substantially flat inner surface being linear over an entire surface that is adapted to receive light rays generated by the plurality of light sources; and
a light exit side comprising an outer surface opposite the linear inner surface and from which the light rays exit the anti-glare refractor, wherein a plurality of prisms are distributed on the outer surface and wherein each prism of the plurality of prisms is defined by a plurality of planar facet surfaces, each planar facet surface having a prism slope angle in a range from about 5 degrees to about 45 degrees with respect to the substantially linear inner surface, wherein each prism comprises an axis passing through an intersection of the planar facet surfaces defining the prism and wherein the prism is approximately symmetrical about the axis, wherein the plurality of prisms are configured such that, regardless of lateral or vertical positioning of each of the plurality of light sources relative to the anti-glare refractor, an anti-glare distribution from the light exit side remains substantially unaffected.

28. The anti-glare refractor of claim 27, wherein the plurality of prisms are arranged on the outer surface in concentric annular ridges, wherein a first prism of the plurality of prisms comprises a continuous facet extending along a first circular path and wherein a second prism of the plurality of prisms comprises a continuous facet extending along a second circular path concentric with and offset from the first circular path.

* * * * *